United States Patent
Gullion et al.

(10) Patent No.: US 12,383,869 B2
(45) Date of Patent: *Aug. 12, 2025

(54) HOT WATER CART CONDITIONING SYSTEM AND METHOD

(71) Applicant: Evoqua Water Technologies LLC, Pittsburgh, PA (US)

(72) Inventors: Michael Gullion, Oakley, CA (US); Joshua Hawley, Colorado Springs, CO (US); Christopher Hall, Fort Meyers, FL (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/656,688

(22) Filed: May 7, 2024

(65) Prior Publication Data
US 2024/0390858 A1 Nov. 28, 2024

Related U.S. Application Data (63) Continuation of application No. 16/954,517, filed as application No. PCT/US2018/066673 on Dec. 20, 2018, now Pat. No. 11,975,294.
(Continued)

(51) Int. Cl.
*C02F 1/44* (2023.01)
*B01D 61/14* (2006.01)
(Continued)

(52) U.S. Cl.
CPC ........... *B01D 65/02* (2013.01); *B01D 61/146* (2022.08); *B01D 61/20* (2013.01); *B01D 61/22* (2013.01);
(Continued)

(58) Field of Classification Search
CPC ...... B01D 65/02; B01D 65/027; B01D 65/00; B01D 61/142; B01D 61/20; B01D 61/22;
(Continued)

(56) References Cited

U.S. PATENT DOCUMENTS

| 4,879,041 A | 11/1989 | Kurokawa et al. |
| 6,203,714 B1 | 3/2001 | Bos et al. |

(Continued)

FOREIGN PATENT DOCUMENTS

| JP | S60261585 A | 12/1985 |
| JP | S62164903 A | 7/1987 |

(Continued)

OTHER PUBLICATIONS

Bin Maarof, Mohd Zaidi, "Examination Clear Report", Malaysian Patent Application No. PI2020002368, mailed Jun. 9, 2024.
(Continued)

*Primary Examiner* — Akash K Varma (57) ABSTRACT

A conditioning system for a filter module is disclosed. The conditioning system may generally include an inlet, a heat exchanger, a magnetically levitated pump, a channel provided to bypass the heat exchanger, a controller, an outlet, and a base. The system may have components lined with corrosion-resistant materials. A method of conditioning a filter module is also disclosed. The method may generally include measuring TOC in a source of ultrapure water, heating the ultrapure water, rinsing a filter module with the heated water, flushing the filter module with ambient temperature water, and repeating the rinsing with heated water and flushing with ambient temperature water. A method of facilitating conditioning of the filter module is also disclosed. The method may generally include providing a portable filter module conditioning system and providing instructions for installation or use.

13 Claims, 3 Drawing Sheets

Related U.S. Application Data (60) Provisional application No. 62/608,214, filed on Dec. 20, 2017.

(51) Int. Cl.
  *B01D 61/20* (2006.01)
  *B01D 61/22* (2006.01)
  *B01D 65/02* (2006.01)
  *F28F 19/02* (2006.01)
  *G01N 15/06* (2024.01)
  *C02F 103/04* (2006.01)

(52) U.S. Cl.
  CPC .............. *C02F 1/444* (2013.01); *F28F 19/02* (2013.01); *G01N 15/06* (2013.01); *B01D 2311/246* (2013.01); *B01D 2313/221* (2022.08); *B01D 2313/48* (2013.01); *B01D 2313/903* (2022.08); *B01D 2321/08* (2013.01); *B01D 2321/40* (2013.01); *C02F 2103/04* (2013.01); *C02F 2209/105* (2013.01); *C02F 2209/20* (2013.01); *C02F 2209/40* (2013.01); *C02F 2303/08* (2013.01); *C02F 2303/16* (2013.01); *G01N 2015/0662* (2013.01)

(58) Field of Classification Search
  CPC .... B01D 61/14; B01D 61/145; B01D 61/146; B01D 35/18; B01D 2311/246; B01D 2311/24; B01D 2313/38; B01D 2313/48; B01D 2313/90; B01D 2313/221; B01D 2313/903; B01D 2313/70; B01D 2313/701; B01D 2321/08; B01D 2321/40; B01D 2321/12; B01D 2321/44; B01D 53/14; B01D 53/1487; B01D 2252/606; C02F 1/444; C02F 1/44; C02F 1/02; C02F 1/16; C02F 2103/04; C02F 2209/105; C02F 2209/20; C02F 2209/40; C02F 2209/002; C02F 2209/05; C02F 2209/21; C02F 2303/08; C02F 2303/16; C02F 2303/22; C02F 2201/48; C02F 2301/02; C02F 2301/043; C02F 11/18; G01N 15/06; G01N 2015/0662; G01N 30/88; G01N 2030/884; G01N 2291/02809; F28F 19/02; F28F 27/02; F28F 2210/04; F28F 2250/04; F28F 2250/06; F28F 2275/22; F04D 13/02; F04D 13/024; F04D 25/026; F16K 31/06; F16K 31/02; F16L 55/1604

USPC ........................................................ 210/96.2
See application file for complete search history.

(56) References Cited

U.S. PATENT DOCUMENTS

| | | | |
|---|---|---|---|
| 6,468,041 | B2 | 10/2002 | Ozaki |
| 7,947,176 | B1* | 5/2011 | Jamieson .................. C02F 1/28 |
| | | | 210/182 |
| 2002/0012594 | A1* | 1/2002 | Ozaki ................. A61M 60/538 |
| | | | 417/423.12 |
| 2008/0245737 | A1 | 10/2008 | Coulter |
| 2008/0245738 | A1* | 10/2008 | Coulter ..................... C02F 9/00 |
| | | | 210/96.1 |
| 2011/0197660 | A1 | 8/2011 | Underwood |
| 2011/0210077 | A1 | 9/2011 | Coulter |
| 2013/0126430 | A1* | 5/2013 | Kenley .................. B01D 61/00 |
| | | | 210/638 |
| 2013/0186835 | A1 | 7/2013 | Coulter |
| 2014/0124189 | A1* | 5/2014 | Campbell ............... F28F 27/02 |
| | | | 165/287 |
| 2015/0166385 | A1 | 6/2015 | Boerm et al. |

FOREIGN PATENT DOCUMENTS

| | | |
|---|---|---|
| JP | 2004275881 A | 10/2004 |
| JP | 2006218440 A | 8/2006 |
| JP | 2010022935 A | 2/2010 |
| JP | 2010044022 A | 2/2010 |
| JP | 2014188465 A | 10/2014 |
| JP | 2018518352 A | 7/2018 |
| JP | 7303187 B2 | 7/2023 |
| WO | 2013040420 A2 | 3/2013 |
| WO | 2015050125 A | 4/2015 |

OTHER PUBLICATIONS

Lee, Sojin, "Notice to Submit Response", South Korean Patent Application No. 10-2020-7017924, mailed Jun. 13, 2024.
Lee, Sojin, "Notice to Submit Response", South Korean Patent Application No. 10-2020-7017924, mailed Feb. 21, 2025.
Nickitas-Etienne, Athina, "International Preliminary Report on Patentability", International Patent Application No. PCT/US2018/066673, mailed Jun. 23, 2020.
Young, Lee W., "International Search Report", International Patent Application No. PCT/US2018/066673, mailed May 1, 2019.
Hasebe, Tomohisa, "Notice of Reasons for Refusal" issued for related Japanese patent application No. 2020-524805 mailed Aug. 18, 2022, 5 pages.
Extended European Search Report, corresponding EP 18893300.6, dated Jul. 26, 2021.

* cited by examiner

HOT WATER CART CONDITIONING SYSTEM AND METHOD

CROSS-REFERENCE TO RELATED APPLICATIONS

This application claims priority under 35 U.S.C. § 119 (e) to U.S. Provisional Application Ser. No. 62/608,214, titled "Vanox Hot Water Cart Conditioning Method," filed on Dec. 20, 2017, which is incorporated herein by reference in its entirety for all purposes.

FIELD OF TECHNOLOGY

Aspects and embodiments disclosed herein are generally directed to filter module conditioning systems, and more specifically, to electronic grade filter module conditioning systems and methods of operating same.

SUMMARY

In accordance with one aspect, there is provided a conditioning system for a filter module. The system may comprise an inlet fluidly connectable to a source of ultrapure water. The system may comprise a heat exchanger lined with a first corrosion resistant material positioned downstream from the inlet. The system may comprise a magnetically levitated pump in fluid communication with the heat exchanger. The system may comprise an outlet positioned downstream from the magnetically levitated pump and fluidly connectable to the filter module. The system may comprise a channel lined with a second corrosion resistant material constructed and arranged to bypass the heat exchanger. The system may comprise a controller configured to selectively direct water to the heat exchanger or to the channel. The controller may be programmable to act responsive to at least one of a concentration of total organic carbon (TOC) in the source of ultrapure water and a concentration of TOC in water at the water outlet. The system may further comprise a base supporting the heat exchanger, the magnetically levitated pump, the channel, and the controller.

In some embodiments, the system may further comprise an inlet sensor configured to detect the concentration of TOC in the source of ultrapure water and an outlet sensor configured to detect the concentration of TOC in the ultrapure water at the outlet. At least one of the inlet sensor and the outlet sensor may be electrically connected to the controller. At least one of the inlet sensor and the outlet sensor may be further configured to detect particle sizes of 10 nm or less.

The inlet may be fluidly connectable downstream from the filter module. In some embodiments, the filter module may be an ultrafiltration module.

In accordance with certain embodiments, the first corrosion resistant material may be stable at a water temperature of up to 190° F. At least one of the first and the second corrosion resistant materials may be a fluoropolymer. At least one of the first and the second corrosion resistant materials may be ethylene tetrafluoroethylene (ETFE), polyvinylfluoride (PVF), polyvinylidene fluoride (PVDF), perfluoroalkoxy alkane (PFA), fluorinated ethylene propylene (FEP), polytetrafluoroethylene (PTFE), ethylene chlorotrifluoroethylene (ECTFE), polychlorotrifluoroethylene (PCTFE), and combinations thereof.

In some embodiments, any metal component of the system may be substantially free of stainless steel. At least one of the metal components may comprise at least one of titanium, incoloy, hastelloy, and combinations thereof.

The system may be portable.

In accordance with certain embodiments, the magnetically levitated pump may be lined with a corrosion resistant plastic.

In some embodiments, the controller may be further programmable to set a speed of the magnetically levitated pump responsive to an indication of capacity of the filter module.

In accordance with another aspect, there is provided a method of conditioning a filter module. The method may comprise measuring a concentration of total organic carbon (TOC) in a source of ultrapure water. The method may comprise heating a source of ultrapure water to between about 170° F. and about 190° F. to produce heated water. The method may comprise rinsing the filter module with the heated water at a first flow rate of between about 2 and about 15 gpm for a first predetermined period of time, sufficient to stabilize a concentration of TOC in water at an outlet of the filter module. The method may comprise flushing the filter module with the source of ultrapure water having ambient temperature at a second flow rate of between about 2 and about 40 gpm for a second predetermined period of time, the second flow rate being greater than the first flow rate. The method may comprise cycling between rinsing the filter module with the heated water and flushing the filter module with the ultrapure water at ambient temperature until the water at the outlet of the filter module has less than 100 counts per liter of particles having a particle size less than 14 nm.

In some embodiments, the filter module may be conditioned before use in water treatment.

In some embodiments, the filter module may be conditioned when the concentration of TOC in the water at the outlet of the filter module is greater than 2 ppb.

The method may further comprise selecting the first flow rate responsive to a capacity of the filter module.

The method may further comprise selecting the temperature of the heated water responsive to a material of the filter module.

In accordance with another aspect, there is provided a method of facilitating conditioning of a filter module. The method may comprise providing a portable filter module conditioning system comprising a heat exchanger lined with a first corrosion resistant material, a magnetically levitated pump in fluid communication with the heat exchanger, a channel lined with a second corrosion resistant material constructed and arranged to bypass the heat exchanger, and a controller configured to selectively direct water to the heat exchanger or to the channel, the controller being programmable to act responsive to at least one of a concentration of total organic carbon (TOC) in water upstream from the heat exchanger and the magnetically levitated pump and a concentration of TOC in water downstream from the magnetically levitated pump. The method may further comprise providing instructions to fluidly connect the portable filter module conditioning system to a source of ultrapure water through an inlet of the portable filter module conditioning system, and fluidly connect the portable filter module conditioning system to a filter module through an outlet of the portable filter module conditioning system.

In some embodiments, the method may further comprise installing an inlet sensor configured to measure the concentration of TOC in the source of ultrapure water and an outlet sensor configured to measure the concentration of TOC in the water downstream from the magnetically levitated pump.

The method may further comprise electrically connecting the controller to the inlet sensor and the outlet sensor.

In accordance with certain embodiments, the method may further comprise fluidly connecting the inlet of the portable filter module conditioning system to the source of ultrapure water and fluidly connecting the outlet of the portable filter module conditioning system to the filter module.

In some embodiments, fluidly connecting the inlet of the portable filter module conditioning system to the source of ultrapure water comprises fluidly connecting the portable filter module conditioning system to an outlet of the filter module.

Fluidly connecting the outlet of the portable filter module conditioning system to the filter module may comprise fluidly connecting the portable filter module conditioning system to an inlet of an ultrafiltration module. In such embodiments, fluidly connecting the inlet of the portable filter module conditioning system to the source of ultrapure water may comprise fluidly connecting the portable filter module conditioning system to an outlet of the ultrafiltration module.

In accordance with certain embodiments, the method may further comprise providing instructions to flush the portable filter module conditioning system before fluidly connecting the portable filter module conditioning system to the filter module.

The disclosure contemplates all combinations of any one or more of the foregoing aspects and/or embodiments, as well as combinations with any one or more of the embodiments set forth in the detailed description and any examples.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Systems and methods disclosed herein may be employed to condition filter modules. While the disclosure may refer to exemplary ultrafiltration modules, it should be understood that the conditioning systems and methods may be employed to condition any filter module in need thereof.

Semiconductor fabrication units generally require very pure water quality to avoid contaminating semiconductor wafers during the manufacturing process. Particulate contamination is one of many concerns. Particles having a size greater than 14 nm in semiconductor device fabrication may yield defects. One device used to remove particulate contamination from water is an ultrafiltration (UF) device. While UF devices remove particles very effectively, modules often require conditioning prior to installation to remove any particles and other manufacturing-related contaminants, such as total organic carbon (TOC), contained within the UF module. Additionally, the UF modules generally require regular maintenance to remove any contaminant buildup from continued use. Systems and methods described herein may strive to produce semiconductor grade water having particles of about 10 nm or less.

In accordance with one aspect, the systems and methods described herein may be employed to condition UF modules before installation and during maintenance in less time than it would take using conventional methods. For instance, conventional methods may take a few weeks to properly condition a filter module. The systems and methods disclosed herein may adequately condition a filter module in a few days, for example, less than 1 day, about 1 day, about 2 days, about 3 days, about 5 days, or less than 1 week. The time it will take to condition a filter module may generally depend on the condition of the filter module before conditioning and the quality of the water used for the conditioning method.

The conditioning method may generally include treating with heated water and flushing with ambient temperature water. The hot water conditioning allows the module pores to open and shed TOCs and particles inherent to the manufacture of the UF from the various resins and plastics. As used herein, "ambient temperature" water at room temperature. It should be understood that room temperature may vary by location, but generally is within a range of about 64° F. to about 77° F. (18° C.-25° C.). Ambient temperature water may refer to uncooled and unheated water. The heated water/ambient temperature water cycling method may provide suitable conditioning for immediate service of the filter module.

Certain benefits are provided by the systems and methods disclosed herein. While the list is not dispositive, the following benefits are envisioned over conventional systems and methods. The systems and methods disclosed herein are compatible with existing high technology demand filter module systems, for example the Vanox® point of use (POU) system (distributed by Evoqua Water Technologies LLC, Pittsburgh, PA) described in U.S. Pat. No. 8,741,155, herein incorporated by reference in its entirety for all purposes. The systems and methods are capable of controlling ramp up and ramp down temperatures with precision, reducing the possibility of causing thermal shock to the filter module. The systems and methods are capable of controlling flow rate with precision. When combining control of temperature and flow rate with feedback results obtained downstream of a filter module, conditioning can be performed more efficiently. The systems and methods described herein can be made compatible with a wide array of filter modules. In certain embodiments, the system can be constructed to be easily maneuverable with a low center of gravity for safe operation. Additional improvements over conventional systems are also envisioned.

In accordance with one aspect, there is provided a method of conditioning a filter module. The method may generally include heating water, rinsing the filter module with heated water to reduce a concentration of contaminants at the outlet of the filter module until the outlet concentration of contaminants stabilizes, flushing the filter module with ambient temperature water, and repeating the rinsing with hot water. With each cycle the concentration of contaminants at the outlet of the filter media may be reduced. Cycles may be continued until a desirable concentration at the outlet of the filter media is reached. Filter media may be conditioned sequentially by section until all sections are properly conditioned.

In some embodiments, cycles may be continued until the filter media produces water with less than about 10 ppb TOC, less than about 5 ppb TOC, less than about 2 ppb TOC, or about 1 ppb TOC. In some embodiments, cycles may be continued until the filter media produces water with less than about 100 particles/L of particles having a size of 14 nm or less, less than about 50 particles/L of particles having a size of 14 nm or less, or less than about 25 particles/L of particles having a size of 14 nm or less. Particles may comprise biological, organic, and inorganic particles. In some embodiments, cycles may be continued until the filter media produces water with less than about 100 particles/L. of particles having a size of 10 nm or less, less than about 50 particles/L of particles having a size of 10 nm or less, or less than about 25 particles/L of particles having a size of 10 nm or less. In some embodiments, cycles may be continued until the filter media produces water having at least one quality of electronics and semiconductor grade ultrapure water, as previously described. In some embodiments, cycles may be continued until the filter media produces water meeting the requirements of electronics and semiconductor grade ultrapure water, as previously described.

The filter module may be conditioned as a pre-treatment before use in water treatment. The conditioning method may be performed to remove contaminants on the filter module, for example, residual contaminants from manufacture. The filter module may additionally or alternatively be conditioned for maintenance, after a specified period of use. In some embodiments, the filter module may be conditioned semiannually, annually, biennially, or as-needed (for example, after a particle wave or hydraulic shock event). The conditioning method may be performed to remove buildup of contaminants from use. Accordingly, the method may include conditioning the filter module with water of a desired quality, sufficient to prevent, limit, or avoid contributing contamination to the filter module. In accordance with certain embodiments, the methods disclosed herein may be performed with high purity water, as previously described.

The method may comprise measuring a concentration of contaminants in the source of water. For example, the method may comprise measuring a concentration of TOC, particles (biological, organic, inorganic), silica, metals, dissolved gases, or other contaminants prior to rinsing or flushing the filter module with the water. The method may further comprise measuring a concentration of contaminants in heated water or pumped water, prior to rinsing or flushing the filter module. The method may further comprise measuring a concentration of contaminants in water at an outlet of the filter module.

In some embodiments, the filter module may be conditioned for maintenance when the concentration of contaminants in the water at the outlet of the filter module reaches a predetermined threshold. For example, the filter module may be conditioned when TOC in the water at the outlet of the filter module is greater than about 10 ppb, for example, greater than about 5 ppb, greater than about 2 ppb, or about 1 ppb. The filter module may be conditioned when the water at the outlet of the filter module comprises more than about 100 particles/L of particles having a size of 10 nm or less, more than about 50 particles/L of particles having a size of 10 nm or less, or more than about 25 particles/I, of particles having a size of 10 nm or less. The filter module may be conditioned when the water at the outlet of the filter module comprises more than about 100 particles/L of particles having a size of 14 nm or less, more than about 50 particles/L of particles having a size of 14 nm or less, or more than about 25 particles/L of particles having a size of 14 nm or less. Thus, the method may comprise measuring a concentration of contaminants at the outlet of the filter module and determining the filter module is in need of maintenance conditioning when the concentration is above a threshold value. The threshold value may be selected depending on the type of filter module and the purity of water desired. For example, the threshold value may be selected to produce electronics and semiconductor grade ultrapure water when the filter module is an ultrafiltration module.

The method may generally include heating the source of water to between about 170° F. (76° C.) and about 190° F. (88° C.) to produce heated water. The method may include heating the source of water to between about 180° F. (82° C.) and about 190° F. (88° C.) or to between about 175° F. (79° C.) and about 185° F. (85° C.). For instance, the method may include heating the source of water to about 170° F., about 175° F., about 180° F., about 185° F., or about 190° F.) (76° C., 79° C., 82° C., 85° C., 88° C.). The temperature may be selected based on the type and/or material of the filter module. In some non-limiting embodiments, the filter module may be heated to about 185° F. (85° C.) for conditioning an ultrafiltration module. Other exemplary modules may be produced from polysulfone, polyvinylidene difluoride (PVDF), fiberglass, or epoxy. Fiberglass and epoxy membranes may be conditioned at a lower temperature than polysulfone and PVDF membranes.

The method may further comprise rinsing the filter module with the heated water at a flow rate of between about 2 and about 15 gpm. The flow rate may be selected based on the capacity or size of the filter module. The flow rate may also be selected based on the type or material of the filter module. In some exemplary, non-limiting embodiments, the flow rate may be between about 2 gpm and about 5 gpm for an ultrafiltration module having a capacity of 15 gpm, the flow rate may be between about 3 gpm and about 7.5 gpm for an ultrafiltration module having a capacity of 35 gpm, and the flow rate may be between about 5 gpm and about 15 gpm for an ultrafiltration module having a capacity greater than 35 gpm.

The method may comprise rinsing the filter module with heated water for a first predetermined period of time, sufficient to stabilize a concentration of contaminants, for example, TOC, particles (biological, organic, inorganic), silica, metals, dissolved gases, or other contaminants in water at an outlet of the filter module, as previously described. The predetermined period of time may be, for example, between about 30 minutes and about 1.5 hours. The predetermined period of time may be, for example, between about 1 hour and about 5 hours. In accordance with certain embodiments, the predetermined period of time may be about 30 minutes, about 45 minutes, about 1 hour, about 1.25 hours, about 1.5 hours, about 2 hours, about 3 hours, about 4 hours, or about 5 hours. In accordance with an exemplary, non-limiting embodiment, a new ultrafiltration module (i.e., which has not been put to use in water treatment), may be rinsed in hot water cycles of about 1 hour. The cycle is generally sufficient to stabilize the concentration of contaminants in water at the outlet of the filter module. The method may comprise performing as many cycles as necessary to achieve the requisite quality water. However, in some embodiments, between about 1 and about 10 cycles may be performed. For instance, between about 3 and about 8 cycles may be performed or between about 4 and about 6 cycles may be performed before the desired quality water is measured at an outlet of the filter module. Generally, the number of cycles may be dependent on the quality of the source of water and the condition of the filter module at the start of the conditioning method.

The method may comprise flushing the filter module with the source of water at ambient temperature after rinsing with hot water. The source of water may generally be unheated/uncooled when flushing the filter module. The filter module may be flushed with water at a flow rate of between about 2 and about 40 gpm. In general, the flow rate for flushing may be greater than the flow rate for rinsing the filter module, at least because filter modules tend to tolerate higher flow rates for ambient temperature water than for heated water. For example, the filter module may be flushed with water at a flow rate of between about 5 gpm and about 40 gpm, between about 7.5 gpm and about 40 gpm, or between about 15 gpm and about 40 gpm.

Additionally, filter modules and conditioning systems may tolerate greater turbidity from ambient temperature water than heated water. Thus, the ambient temperature water may be provided at a greater turbidity to flush residual contaminants from the filter module. The turbidity may be dependent on the conduit used to provide the ambient temperature water.

The filter module may be flushed for a predetermined period of time sufficient to expel stubborn contaminants from the filter module. In general, the filter module may be flushed with ambient temperature water for a period of time less than the period of time for rinsing with heated water. In some embodiments, the filter module may be flushed with ambient temperature water for less than about 5 hours. In some embodiments, the filter module may be flushed with ambient temperature water for less than about 1.5 hours. For example, the filter module may be flushed with ambient temperature water for less than about 5 hours, less than about 4 hours, less than about 3 hours, less than about 2 hours, less than about 1.5 hours, less than about 1.25 hours, less than about 1.0 hours, less than about 45 minutes, or less than about 30 minutes. The filter module may be flushed for a few minutes, for example, about 2 minutes, about 5 minutes, about 10 minutes, about 15 minutes, or about 20 minutes.

The conditioning methods disclosed herein may be performed with a conditioning system for a filter module. The system may be portable, for example, mobile. The conditioning method may be performed at the manufacturing site, for example, filter module manufacturing site, before providing the filter module to a customer. The conditioning method may be performed at the customer's facility, for example, in a maintenance area (optionally, near a point of use for the filter module) or at the skid on which the filter module is to be installed prior to installation.

In accordance with another aspect, there is provided a conditioning system for a filter module. The system may generally include a heat exchanger, a water pump, and a controller. The heat exchanger and the water pump may be fluidly connectable to each other. In use, the heat exchanger and the water pump may be fluidly connected. The controller may be operatively connectable to at least one of the heat exchanger and the water pump. In use, the controller may be operatively connected to at least one of the heat exchanger and the water pump. In some embodiments, the controller may be operatively connected to the heat exchanger and the water pump. The system may comprise a valve constructed and arranged to direct water flow within the system. In some embodiments, the valve may be operatively connectable to the controller. The valve may be operatively connected to the controller such that the controller may operate the valve to direct water within the system. The system may comprise a channel constructed and arranged to bypass the heat exchanger. In some embodiments, the controller may operate the valve to selectively direct water to the heat exchanger or to the bypass channel.

The system may further comprise additional pumps, valves, or channels, as necessary to implement the methods disclosed herein. For instance, the system may comprise a pressure control valve and/or pressure regulating valve to release pressure buildup. In some embodiments, the system may contain an air regulator to provide controlled and/or consistent air pressure within the system. The system may further include a check valve to prevent backflow within the system.

In accordance with certain embodiments, one or more component of the system may be lined with a corrosion resistant material. As disclosed herein, a component being "lined" with a material may include constructing the component from the material, the component may comprise the material, or the component may consist essentially of or consist of the material. Generally, the component being lined with a material may refer to components for which, in use, water only contacts the lining material. For example, other materials of the component may be substantially free from contacting water when in use. In some embodiments, the lining material may cover the water-contacting surface. The lining material may be included as a layer on the water-contacting surface.

Exemplary corrosion resistant materials may include corrosion resistant plastics. In some embodiments, the corrosion resistant material may be a fluoropolymer. For instance, the corrosion resistant material may be ethylene tetrafluoroethylene (ETFE), polyvinylfluoride (PVF), polyvinylidene fluoride (PVDF), perfluoroalkoxy alkane (PFA), fluorinated ethylene propylene (FEP), polytetrafluoroethylene (PTFE), ethylene chlorotrifluoroethylene (ECTFE), polychlorotrifluoroethylene (PCTFE), and combinations thereof. The corrosion resistant material may be selected for stability at a desired water temperature and turbidity. For instance, the corrosion resistant material may be stable at a water temperature of up to 190° F. (88° C.). The corrosion resistant material may be stable against water at turbulent flow.

Metal components may be limited in the system. The system may be substantially free or free of metal components which contact the water when in use. In general, metal components may be undesirable when they lose stability at high temperatures. Metal components in the system may be selected for high temperature strength and resistance to high temperature corrosion (for example, oxidation and carburization). In some embodiments, the metal components may comprise at least one of titanium, an Incoloy® alloy (distributed by Special Metals Corporation, New Hartford, New York), a Hastelloy® alloy (distributed by Special Metals Corporation, New Hartford, New York), and combinations thereof. In some embodiments, any metal component of the system may be substantially free of stainless steel.

The system may include a heat exchanger lined with a corrosion resistant material. The heat exchanger may be utilized to regulate temperature of the water. The heat exchanger may be of any convenient type which is capable of heating water to a temperature of up to 190° F. (88° C.). In some embodiments, the heat exchanger may be an immersion heat exchanger. Accordingly, the corrosion resistant lining may generally be stable at a water temperature of up to 190° F. (88° C.) for a wide range of water turbidities. In general, the heat exchanger should hold the process water isolated from any heating/cooling fluid or gas, to preserve the high purity of the process water. In many instances, the heat exchanger may be configured to heat water to a temperature of between about 170° F. (76° C.) and about 190° F. (88° C.), for example, about 170° F., about 175° F., about 180° F., about 185° F., or about 190° F. (76° C., 79° C., 82° C., 85° C., 88° C.). In some rare instances, the heat exchanger may be configured to cool water to the temperature of between about 170° F. (76° C.) and about 190° F. (88° C.), (for example, 170° F., 175° F., 180° F., 185° F., 190° F.) (76° C., 79° C., 82° C., 85° C., 88° C.).

The system may include a magnetically levitated pump in fluid communication with the heat exchanger. The pump may be capable of pumping water at a flow rate of up to about 40 gallons per minute (gpm). The pump may comprise a suspended contact-free impeller positioned inside a sealed casing. The impeller maybe driven by a magnetic field generated by the motor. Based on the principles of magnetic levitation, the impeller may be free from contacting other surfaces. The magnetically levitated pump may comprise magnetic bearings. The magnetically levitated pump may be substantially free of bearings, for example, as a centrifugal pump. The magnetically levitated pump may be substantially free of a rotameter. Advantages of a magnetically levitated pump include no production of particles, no abrasion, and no need for a lubricant. Each of these advantages may assist in maintaining the water quality within the system at a high purity. Exemplary magnetically levitated pumps include those in the BPS™ and PuraLev® series (distributed by Levitronix, Framingham, Massachusetts).

In accordance with certain embodiments, the magnetically levitated pump may be lined with a corrosion resistant material. In some embodiments, at least one of the impeller and the casing may be lined with the corrosion resistant material. The magnetically levitated pump may be lined with a corrosion resistant plastic. The magnetically levitated pump may be free of stainless steel on any component which makes contact with the water while in use. For instance, the magnetically impeller and/or casing may be substantially free of stainless steel on surfaces which contact the water while in use.

The system may comprise one or more channels constructed and arranged to carry process water within the system. The one or more channels may be lined with a corrosion resistant material. The corrosion resistant material may be selected to be stable for a given temperature or turbidity, depending on the placement of the channel within the system. For instance, the system may include a bypass channel lined with a corrosion resistant material. The bypass channel may be constructed and arranged to bypass the heat exchanger. The corrosion resistant lining may generally be stable for transitional and turbulent flow. For flow through a pipe, transitional flow may be characterized by a Reynolds number of at least 2100, for example, at least 2300, turbulent flow may be characterized by a Reynolds number of at least 4000. The system may further include a channel downstream from the heat exchanger lined with a corrosion resistant material. The corrosion resistant lining for such a channel may be stable for high temperature water.

The system may further include a user interface. The user interface may be operatively connectable to at least one of the heat exchanger, the magnetically levitated pump, and a valve of the system. In use, the user interface may be operatively connected to at least one of the heat exchanger, the magnetically levitated pump, and a valve of the system. The user interface may be employed by an operator to control, for example, temperature of the water (through the heat exchanger), flow rate of the water (through the magnetically levitated pump), and flow path of the water through the system (through a valve, for example, through a valve which selectively directs water to the heat exchanger or to the bypass channel). The user interface may be controlled manually by the operator (as-needed), may be programmed to perform one or more acts on a timer, or responsive to feedback. In some embodiments, the user interface may be operatively connectable to a controller.

The system may comprise a controller. The controller may be programmable to perform one or more acts automatically, for example, responsive to feedback from another component. The controller may be operatively connectable to at least one of the heat exchanger, the magnetically levitated pump, and a valve of the system. In use, the controller may be operatively connected to at least one of the heat exchanger, the magnetically levitated pump, and a valve of the system.

The controller may be configured to selectively direct water to the heat exchanger or to the channel. To implement the action, the controller may be operably connected to a valve. The controller may be programmable to act responsive to a water quality of the source of water, a water quality of water at the outlet of the system, or a water quality of water downstream from the filter module. In some embodiments, the controller may be programmable to act responsive to a concentration of TOC, for example, a concentration of TOC in the source of water or a concentration of TOC in water at the outlet of the system. The controller may be programmable to act responsive to a concentration of particles (biological, organic, and inorganic), for example, a concentration of particles in the source of water or a concentration of particles in water downstream from the filter module. The concentration of particles may be measured for particles having an average size of about 1 μm, about 100 nm, about 50 nm, about 14 nm, about 10 nm, or less than 10 nm.

The system may comprise one or more sensors configured to determine water quality of at least one of the source of water, water at the outlet of the system, or water downstream from the filter module. The sensors may measure temperature, flow rate, pressure, or concentration of one or more contaminants, for example, particle size and concentration, TOC, dissolved oxygen, metals, microorganisms, silica, and others. The sensors may include, for example, ultrasonic flow meters, temperature transmitters, and air regulators. The sensors may be in-line sensors. In general, in-line instrumentation may provide the greatest accuracy in measuring concentration of contaminants at such low levels. In-line instrumentation may also reduce contamination in the system. An exemplary in-line particle counter is the liquid particle counter distributed by Kanomax®, Wilmington, North Carolina.

The one or more sensors may be electrically connectable to the user interface and/or controller. In use, the one or more sensors may be electrically connected to the user interface and/or controller. Such electrical connection may be through one or more wires or wireless. The user interface may display one or more parameters measured by a sensor. In some embodiments, the user interface may be operated to make a required or desired system change responsive to a result displayed on the user interface to the operator. The controller may be configured to act responsive to a measurement communicated by a sensor. In some embodiments, the controller may be configured to alter temperature of the heat exchanger, flow rate of the process water, or selectively direct process water to the heat exchanger or bypass channel, for example, responsive to a measurement of TOC or particle concentration. The controller may be configured to alter flow rate responsive to the temperature of the water (for example, increase pump speed when the valve is positioned to direct process water to the bypass channel) or to alter flow rate responsive to the type, size, capacity, and/or material of the filter module.

In some non-limiting embodiments, the system may comprise an inlet sensor configured to detect the concentration of TOC in the source of water and an outlet sensor configured to detect the concentration of TOC in the water at the outlet of the system. The system may comprise an inlet sensor configured to detect the concentration of particles having a size of 10 nm or less in the source of water and an outlet sensor configured to detect the concentration of particles having a size of 10 nm or less in the water at the outlet of the system. At least one of the inlet sensor and the outlet sensor may be electrically connected to the controller. A sensor configured to detect concentration of TOC and/or particles having a size of 10 nm or less at an outlet of the filter module may also be electrically connected to the controller.

In some embodiments, the controller may be further programmable to set a speed of the magnetically levitated pump responsive to an indication of size or capacity of the filter module. The size or capacity of the filter module may be communicated to the controller manually, for example, via the user interface. In some embodiments, the system may be configured to detect the size or capacity of the filter module and control the speed of the magnetically levitated pump (i.e. flow rate of the process water) accordingly. In some exemplary, non-limiting embodiments, the controller may be configured to set the system to pump water at a flow rate of between about 2 gpm and about 5 gpm for a filter module having a capacity of 15 gpm, pump water at a flow rate of between about 3 gpm and about 7.5 gpm for a filter module having a capacity of 35 gpm, and pump water at a flow rate of between about 5 gpm and about 15 gpm for a filter module having a capacity greater than 35 gpm. The controller may be configured to set the system to pump water having ambient temperature at a flow rate of up to about 40 gpm. In general, the flow rate may be selected dependent on the type and material of the filter module. The flow rate may be selected dependent on the temperature of the water at the outlet of the system.

The system may include an inlet, fluidly connectable to a source of water. The source of water may generally be of a desired quality, sufficient to prevent, limit, or avoid contributing contamination to the system. In accordance with certain embodiments, the source of water may be high purity water. The source of water may have a low concentration of TOC, for example, less than about 1 ppm, less than about 100 ppb, or less than 10 ppb. Examples of high purity water include ultrapure water and water of grades 1-3 as established by the International Organization for Standardization (ISO) or types I-IV as established by American Society for Testing and Materials (ASTM) International. The source of water may be ultrapure water. In some specific non-limiting embodiments, ultrapure water has a resistivity of about 18.18 M$\Omega$/cm at 25° C. The ultrapure water may meet standards for laboratory ultrapure water (for example, less than 1 µg/L TOC, less than 200 particles/L of biological, organic, and inorganic matter, less than 0.1 µg/L non-volatile residue, less than 0.5 µg/L silica, less than 0.01 µg/L of other elements, less than 0.05 µg/L of ionic compounds, less than 1 CFU/100 mL of microbiological particles, or any other parameter meeting the guidelines set forth by the United States Pharmacopeia or the Semiconductor Equipment and Materials International standards).

The source of water may be electronics and semiconductor grade ultrapure water of types E1-E4 (including E1.1-E1.3), as established by ASTM International. For example, the source of water may have less than 1000 µg/L TOC (for example, less than 300 µg/L, 50 µg/L, 5 µg/L, 2 µg/L, or 1 µg/L TOC), less than 25 µg/L dissolved oxygen (for example, less than 10 µg/L, 5 µg/L, or 3 µg/L dissolved oxygen), less than 100 particles/L of biological, organic, or inorganic particles having an average size of 1.0 µm (for example, less than 20 particles/L or 1 particle/L), less than 1000 µg/L of silica (for example, less than 50 µg/L, 10 µg/L, 5 µg/L, 3 µg/L, 1 µg/L, or 0.5 µg/L of silica), less than 10 CFU/L of microorganisms (for example, less than 5 CFU/L, 3 CFU/L, or 1 CFU/L of microorganisms), less than 100,000 SEM particles/L of SEM particles having an average size of 10 µm (for example, less than 50 particles/L, 30 particles/L, or 10 particles/L of SEM particles). The source of water may have a resistivity of less than about 18.2 M$\Omega$/cm at 25° C., for example, about 18.1 M$\Omega$/cm, about 16.5 M$\Omega$/cm, about 12 M$\Omega$/cm, or about 0.5 M$\Omega$/cm.

The source of water may have been treated for removal of gross suspended substances (for example, by addition of a coagulant or precipitating agent, use of a clarifier, sedimentation tank or particulate filtrate system like a sand filter, disposable filter element, ultrafiltration membrane or other membrane, and/or use of an absorption/entrapment bed comprising greensand, activated carbon, a synthetic material or a porous resin). The source of water may have been treated for desalination (for example, by use of an ion exchange system, reverse osmosis, electrodialysis, electrodeionization, and/or continuous electrodeionization). The source of water may have been treated for removal of organic or biological substances (for example, by addition of hydrogen peroxide or ozone, and/or ultraviolet light treatment). The source of water may have been treated for removal of biological, organic, and inorganic particles (for example, by use of a microporous membrane).

In accordance with certain embodiments, the source of water may be water which has been treated by the filter module. The inlet of the system may be fluidly connectable downstream from the filter module. In use, the inlet of the system may be fluidly connected downstream from the filter module. For instance, the inlet of the conditioning system may be fluidly connectable downstream from the ultrafiltration module which the system is configured to condition. In such an arrangement, a portion of the water treated by the filter module may be redirected to the inlet of the conditioning system.

The system may comprise an outlet positioned downstream from the magnetically levitated pump. The outlet may be fluidly connectable to the filter module for conditioning. In some embodiments, the outlet may comprise a valve for turning delivery of the water on or off. The outlet may comprise a nozzle with one or more configurations for delivery of the water to the filter module. For example, the nozzle may be configured to discharge the process water as a narrow stream, wide shower, or combination thereof. In some embodiments, the user interface and/or controller may be operatively connected to the valve or nozzle of the outlet. The operator or controller may select to shut off delivery of the process water to the filter module responsive to a water quality at the outlet of the filter module. The operator or controller may select a stream of the process water responsive to a type, size and/or material of the filter module. The operator or controller may select a stream of the process water responsive to temperature of the process water (for example, heated water or ambient temperature water).

The system may further comprise a base supporting one or more components of the system. For instance, the system may comprise a base supporting the heat exchanger, the magnetically levitated pump, the channel, and/or the controller. The base may further be positioned to support the user interface and/or any valves, additional channels, additional pumps of the system. Generally, the base may be configured to render the system portable. The base may provide ease of transportation of the system by holding the components of the system together in a compact configuration. The base may comprise a motion-enabling element, for example, wheels and/or a track. In some embodiments, the base may provide ease of use of the system when conditioning the filter module. The motion-enabling element may provide 360° range of travel. In some embodiments, the filter module may be mounted on the base for treatment.

The system may further include one or more power components. For instance, the system may include a power disconnect switch to power on or off the system. The system may include a power transformer and, optionally, a power feed disconnect.

Figure 1:
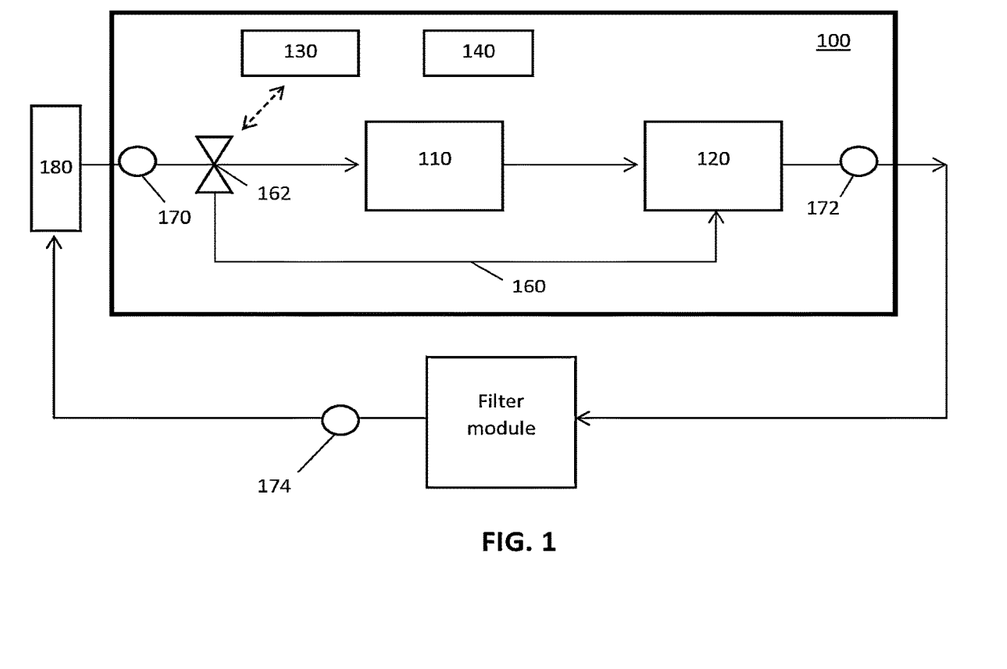
FIG. 1 is a box diagram of a conditioning system for a filter module, according to one embodiment.
Figure 2:
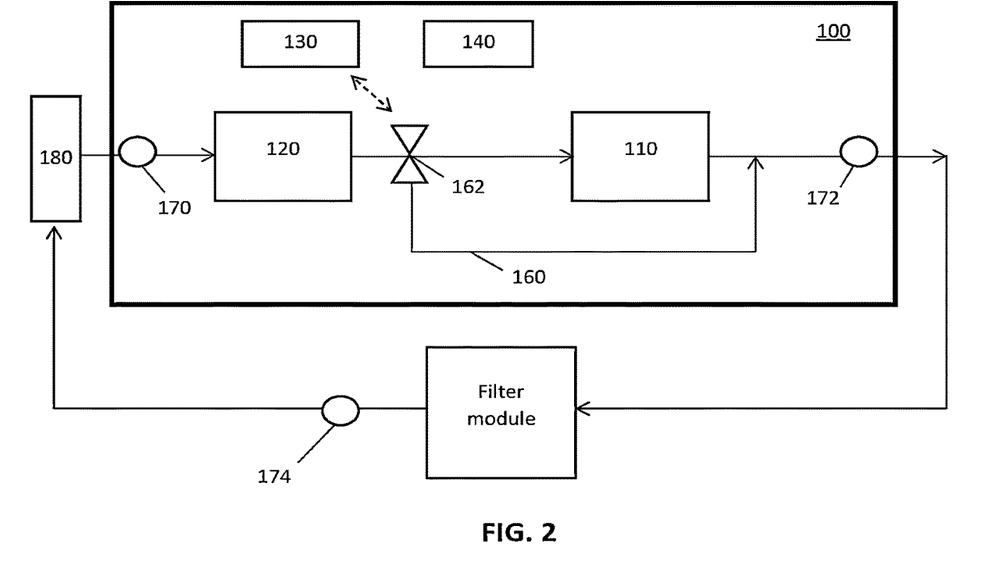
FIG. 2 is a box diagram of a conditioning system for a filter module, according to an alternate embodiment.

As shown in FIGS. 1 and 2, an exemplary system 100 may include heat exchanger 110 and magnetically levitated pump 120 fluidly connected to each other. The heat exchanger 110 and magnetically levitated pump 120 may each be positioned downstream from the inlet and upstream from the outlet. The inlet may be configured to receive water from a source of water 180. A channel 160 may be included to bypass the heat exchanger 110. At the inlet of channel 160, valve 162 may selectively direct water to the channel 160 or the heat exchanger 110. Controller 130 may be operatively connected to the valve 162, such that the controller 130 may operate the valve 162. The system may include one or more sensors, for example, inlet sensor 170 and outlet sensor 172, to measure a system parameter. The sensors 170, 172 may be electrically connected to the controller 130. The controller 130 may further be electrically connected to a sensor 174 positioned at an outlet of the filter module. A user interface 140 may be provided to display measurements obtained by the sensors 170, 172, 174 and/or to allow an operator to control one or more system components.

In the embodiment shown in FIG. 1, heat exchanger 110 is positioned upstream from magnetically levitated pump 120. Bypass channel 160 is fluidly connected to a separate inlet of the magnetically levitated pump 120. In such an embodiment, the magnetically levitated pump 120 may process heated water or ambient temperature water, depending on the directionality provided by valve 162. In an alternate embodiment shown in FIG. 2, magnetically levitated pump 120 is positioned upstream from heat exchanger 110. Bypass channel 160 is positioned downstream from magnetically levitated pump 120. In such an embodiment, magnetically levitated pump 120 may process ambient temperature water.

Figure 3A:
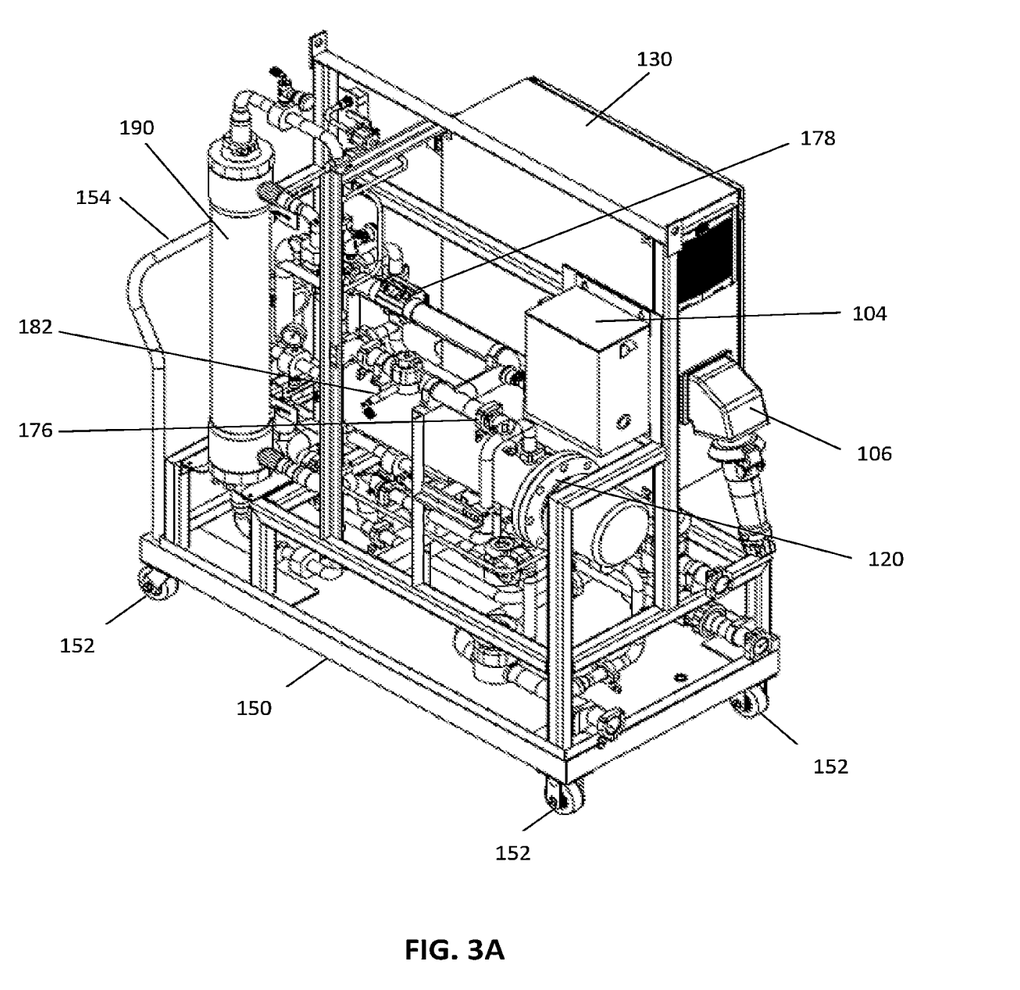
FIG. 3A is a perspective view of a conditioning system for a filter module from a first side, according to one embodiment.
Figure 3B:
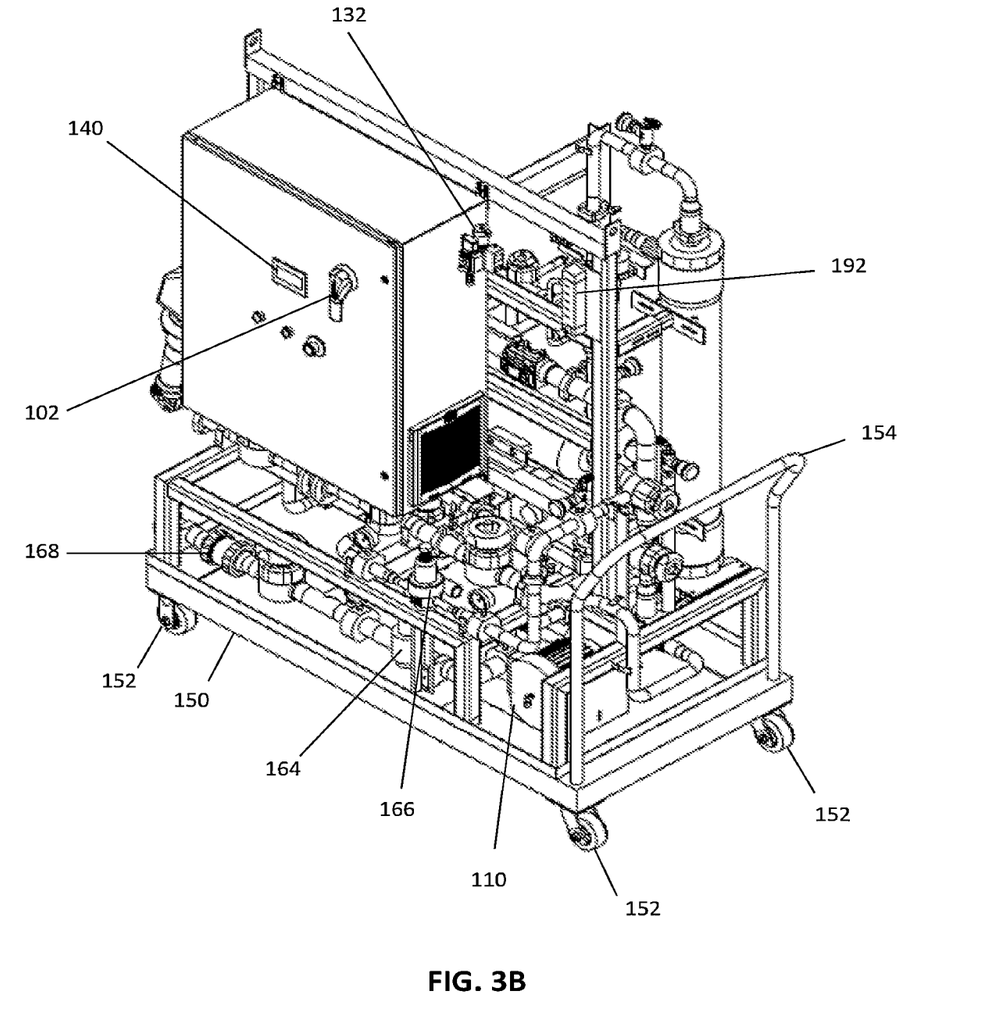
FIG. 3B is a perspective view of the conditioning system shown in FIG. 3A from a second side, according to one embodiment.

FIGS. 3A and 3B are perspective views of an exemplary filter module conditioning system. The system shown in FIGS. 3A-3B is positioned on base 150 for ease of transportation. The base 150 may include motion-enabling elements 152 (in FIGS. 3A-3B, wheels). The base 150 may further include a handle 154 for ease of operating. Exemplary dimensions for a system as shown in FIGS. 3A-3B may be, for example, about 60-70 in. length (60 in., 65 in., 70 in.) (152 cm, 165 cm, 178 cm); about 25-35 in. width (25 in., 30 in., 35 in.) (63 cm, 76 cm, 89 cm); about 70-80 in. height (70 in., 75 in., 80 in.) (178 cm, 190 cm, 203 cm).

The exemplary system of FIGS. 3A-3B may further include a magnetically levitated pump 110 and a heat exchanger 120. A power disconnect switch 102 may be used to shut the system on or off. For example, the power disconnect switch 102 may be used to shut the controller 130 or the user interface 140 on or off. The system may further include a power transformer 104. The system may further include a power feed quick disconnect 106. The system may include one or more sensors. For example, the exemplary system of FIGS. 3A-3B includes an ultrasonic flow meter 178 and a temperature transmitter 176. The system may include a sample port 182. The system may further include one or more valves or check valves. For example, the exemplary system of FIGS. 3A-3B includes a check valve 168, a pressure control valve 164, and a pressure regulating valve 166. The system may include an air regulator 132. In some embodiments, for example, as shown in FIGS. 3A-3B, the filter module 190 may be mountable on the base 150 of the system. Such a system may further include a filter module reject flow meter 192.

Methods disclosed herein may include measuring a concentration of TOC in a source of water 170, heating the source of water 110, rinsing a filter module with the heated water, flushing the filter module with water having ambient temperature (for example, with water that bypasses a heat exchanger through bypass channel 160), and cycling between rinsing the filter module with heated water 110 and ambient temperature water 160. In some embodiments, the flow rate of the heated water and/or ambient temperature water may be controlled 120.

Generally, the systems disclosed herein are adaptable to any filter module with more than one port. In some embodiments, the systems are fluidly connected to a filter module having at least one inlet and one outlet, for example, one permeate. The filter module may additionally have at least one reject port. The filter module may have four ports, for example, one inlet, one reject, and two permeate ports. Adaptor pieces may be provided to connect the filter module to the conditioning system. In some embodiments, the adapter pieces may be configured to connect to 1½" sanitary hose connections on the conditioning system.

Additional embodiments are provided for ease of filter module treatment. In certain embodiments, for example, where skidded filter module connections are available, it may be possible to locate the conditioning system next to an isolated service module and fluidly connect the system for treatment of the module without having to remove the filter. This embodiment can be particularly useful for maintenance of the filter module.

In accordance with another aspect, there is provided a method of facilitating conditioning of a filter module. The method may comprise providing a portable filter module conditioning system, for example, as shown in FIGS. 1 and 2 (system 100) and as described herein. The method may further comprise providing instructions to install the conditioning system and or to operate the conditioning system according to one of the methods disclosed herein. In certain embodiments, the method may comprise providing instructions to fluidly connect the conditioning system to a source of high purity water through an inlet of the conditioning system. The method may further comprise providing instructions to fluidly connect the conditioning system to a filter module through an outlet of the conditioning system. The method may include connecting the system to a power source and/or providing power to the system.

In certain embodiments, the method may further comprise performing any of the fluid connections instructed. Thus, the method may comprise fluidly connecting the inlet of the conditioning system to the source of ultrapure water and fluidly connecting the outlet of the conditioning system to the filter module.

In certain embodiments, an operator may wish to operate the conditioning system with high quality water produced by the same filter module which is to be conditioned. This arrangement may be convenient for on-site treatment of filter modules. The method may comprise fluidly connecting an inlet of the conditioning system to an outlet of the filter module. For instance, the operator may be instructed to condition an ultrafiltration module by fluidly connecting an outlet of the conditioning system to an inlet of the ultrafiltration module. In such embodiments, the method may further comprise fluidly connecting an inlet of the conditioning system to an outlet of the ultrafiltration module. For efficiency, the outlet of the filter module may contain a port for bleeding out a portion of the water which is connected to the inlet of the conditioning system. The filter module may continue to operate normally.

In some embodiments, the method may further comprise installing an inlet sensor configured to measure the concentration of a contaminant in the source of water. The method may further comprise installing an outlet sensor configured to measure the concentration a contaminant in water downstream from the magnetically levitated pump. The method may further comprise electrically connecting a controller to the inlet sensor and the outlet sensor for operation. In some embodiments, the method may comprise electrically connecting the controller to a sensor configured to measure the concentration of a contaminant in water at an outlet of the filter module. The sensors may be in-line sensors, as previously described. The sensors may be configured to measure any contaminant as previously described. The method may further comprise connecting the controller to the bypass channel valve, to the magnetically levitated pump, and/or to the heat exchanger. The controller may be programmed to operate as previously described. In some embodiments, the controller may further be electrically connected to one or more additional valves, pumps, or other components as necessary to operate by the methods described herein.

In accordance with certain embodiments, the method may further comprise providing instructions to pre-treat the conditioning system before operating the conditioning system with a filter module. For instance, instructions may be provided to flush the conditioning system before fluidly connecting the conditioning system to the filter module. In accordance with certain embodiments, a concentration of contaminants at the inlet of the conditioning system and at the outlet of the conditioning system may be measured. The conditioning system may be pre-treated until the concentration of contaminants at the outlet of the conditioning system is substantially similar to the concentration of contaminants at the inlet of the conditioning system. Thus, an operator can ensure the conditioning system is not contributing contaminants to the process water. The substantially similar concentrations may be within about 5%, within about 3%, within about 2%, within about 1%, within about 0.5%, within about 0.1%, within about 0.05%, or within about 0.01% of each other.

In another aspect, a method of providing a conditioning service is also disclosed. As shown in FIGS. 1 and 2, a conditioning system 100 may be provided on a temporary basis to a customer for conditioning of a module prior to use or for maintenance. The conditioning system may be fluidly connected to the filter module and the methods performed at the customer's site as a service offering. In some embodiments, instructions for fluidly connecting the conditioning system may be provided. The water quality after conditioning may be monitored to ensure that the performance meets specific customer requirements before use. The water quality may be monitored during use to determine when maintenance may be required. In some embodiments, a maintenance schedule may be selected by measuring water quality for a period of time sufficient to determine average usage between maintenance periods. Maintenance may be scheduled and/or performed semiannually, annually, biennially, or as-needed (for example, after a particle wave or hydraulic shock event).

Prophetic Example

A section of an ultrafiltration module may be conditioned before being installed for water treatment. In a first conditioning cycle, the section of the ultrafiltration module may be rinsed with water at a temperature of 185° F. for one hour. An initial concentration of 4000 ppb TOC is recorded downstream from the ultrafiltration module. During the rinse, the concentration of TOC stabilizes at 200 ppb. The section of the ultrafiltration module may be flushed with ambient temperature water (70° F.) where downstream water goes to drain.

In a second conditioning cycle, the section may be rinsed with water at a temperature of 185° F. for one hour. An initial concentration of 400 ppb TOC is recorded downstream from the ultrafiltration module. During the second rinse, the concentration of TOC stabilizes at 20 ppb. The section may be flushed a second time with ambient temperature water (70° F.) where downstream water goes to drain.

In a third conditioning cycle, the section may be rinsed with water at a temperature of 185° F. for one hour. An initial concentration of 200 ppb TOC is recorded downstream from the ultrafiltration module. During the rinse, the concentration of TOC stabilizes at 2 ppb. Optionally, a third flush with ambient temperature water (70° F.) may be performed.

The method may be repeated for consecutive sections until all sections of the ultrafiltration module have been conditioned.

The systems and methods disclosed herein may be employed to condition ultrafiltration modules prior to treatment in less time than conventional methods.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment, it is to be appreciated various alterations, modifications, and improvements will readily occur to those skilled in the art. Any feature described in any embodiment may be included in or substituted for any feature of any other embodiment. Such alterations, modifications, and improvements are intended to be part of this disclosure and are intended to be within the scope of the invention. Accordingly, the foregoing description and drawings are by way of example only.

Those skilled in the art should appreciate that the parameters and configurations described herein are exemplary and that actual parameters and/or configurations will depend on the specific application in which the disclosed methods and materials are used. Those skilled in the art should also recognize or be able to ascertain, using no more than routine experimentation, equivalents to the specific embodiments disclosed.

What is claimed is:

1. A method of conditioning a filter module comprising:
   measuring a concentration of total organic carbon (TOC) in a source of ultrapure water; heating the source of ultrapure water to between about 170° F. and about 190° F. to produce heated water;
   rinsing the filter module with the heated water at a first flow rate of between about 2 gpm and about 15 gpm for a first predetermined period of time sufficient to stabilize a concentration of TOC in water at an outlet of the filter module;
   flushing the filter module with the source of ultrapure water having ambient temperature at a second flow rate of between about 2 gpm and about 40 gpm for a second predetermined period of time, the second flow rate being greater than the first flow rate; and
   cycling between rinsing the filter module with the heated water and flushing the filter module with the source of ultrapure water at ambient temperature until the water at the outlet of the filter module has less than 100 counts per liter of particles having a particle size less than 14 nm.

2. The method of claim 1, wherein the filter module is conditioned before use in water treatment.

3. The method of claim 1, wherein the filter module is conditioned when the concentration of TOC in the water at the outlet of the filter module is greater than 2 ppb.

4. The method of claim 1, further comprising selecting the first flow rate responsive to a capacity of the filter module.

5. The method of claim 1, further comprising selecting a temperature of the heated water responsive to a material of the filter module.

6. A method of facilitating conditioning of a filter module comprising:
   providing a portable filter module conditioning system comprising:
   a heat exchanger lined with a first corrosion resistant material;
   a magnetically levitated pump in fluid communication with the heat exchanger;
   a channel lined with a second corrosion resistant material constructed and arranged to bypass the heat exchanger; and
   a controller configured to selectively direct water to the heat exchanger or to the channel, the controller being programmable to act responsive to at least one of a concentration of total organic carbon (TOC) in the water upstream from the heat exchanger and the magnetically levitated pump, and a concentration of TOC in the water downstream from the magnetically levitated pump; and
   providing instructions to fluidly connect the portable filter module conditioning system to a source of ultrapure water through an inlet of the portable filter module conditioning system and fluidly connect the portable filter module conditioning system to the filter module through an outlet of the portable filter module conditioning system.

7. The method of claim 6, further comprising installing an inlet sensor configured to measure the concentration of TOC in the source of ultrapure water and an outlet sensor configured to measure the concentration of TOC in the water downstream from the magnetically levitated pump.

8. The method of claim 7, further comprising electrically connecting the controller to the inlet sensor and the outlet sensor.

9. The method of claim 6, further comprising fluidly connecting the inlet of the portable filter module conditioning system to the source of ultrapure water and fluidly connecting the outlet of the portable filter module conditioning system to the filter module.

10. The method of claim 9, wherein fluidly connecting the inlet of the portable filter module conditioning system to the source of ultrapure water comprises fluidly connecting the portable filter module conditioning system to an outlet of the filter module.

11. The method of claim 9, wherein fluidly connecting the outlet of the portable filter module conditioning system to the filter module comprises fluidly connecting the portable filter module conditioning system to an inlet of an ultrafiltration module.

12. The method of claim 11, wherein fluidly connecting the inlet of the portable filter module conditioning system to the source of ultrapure water comprises fluidly connecting the portable filter module conditioning system to an outlet of the ultrafiltration module.

13. The method of claim 6, further comprising providing the instructions to flush the portable filter module conditioning system before fluidly connecting the portable filter module conditioning system to the filter module.

* * * * *